United States Patent [19]

Reuter

[11] Patent Number: 4,834,323

[45] Date of Patent: May 30, 1989

[54] RADIALLY CONSTRUCTED CRUCIFORM PARACHUTE

[75] Inventor: James D. Reuter, Manchester, Conn.

[73] Assignee: Pioneer Aerospace Corporation, South Windsor, Conn.

[21] Appl. No.: 42,061

[22] Filed: Apr. 24, 1987

[51] Int. Cl.⁴ .............................................. B64D 17/02
[52] U.S. Cl. .................................................. 244/145
[58] Field of Search ........................ 244/145, 142, 152

[56] References Cited

U.S. PATENT DOCUMENTS

| | | | |
|---|---|---|---|
| 2,358,582 | 9/1944 | Little | 244/145 |
| 2,745,615 | 5/1956 | Fogal | 244/145 |
| 3,521,841 | 7/1970 | Finney et al. | 244/145 |
| 4,524,930 | 6/1985 | Lindgren et al. | 244/152 |

FOREIGN PATENT DOCUMENTS

| | | | |
|---|---|---|---|
| 958713 | 5/1964 | United Kingdom | 244/152 |
| 2084523 | 4/1982 | United Kingdom | 244/145 |

*Primary Examiner*—Galen Barefoot
*Attorney, Agent, or Firm*—Sperry, Zoda & Kane

[57] ABSTRACT

An improved cruciform parachute being radially constructing having a canopy which is hemispherically-shaped with an apex at the uppermost portion thereof. A plurality of panels extend vertically from adjacent the apex to a lower canopy edge. Each panel includes an upper panel section and a lower panel section with an intermediate edge therebetween. A plurality of open sections are defined by the lower panel sections of certain of the panel members in order to define a plurality of gores. These gores are diametrically opposite from other similarly shaped gores with each cruciform parachute having four such gores. Each gore is preferably defined by two adjacent panel members having lower panel sections defining open sections therein. Preferably the intermediate edge immediately above two adjacent lower panel members which are open will be inclined upwardly toward one another to form a conventional cruciform parachute gore but with a radial construction.

2 Claims, 1 Drawing Sheet

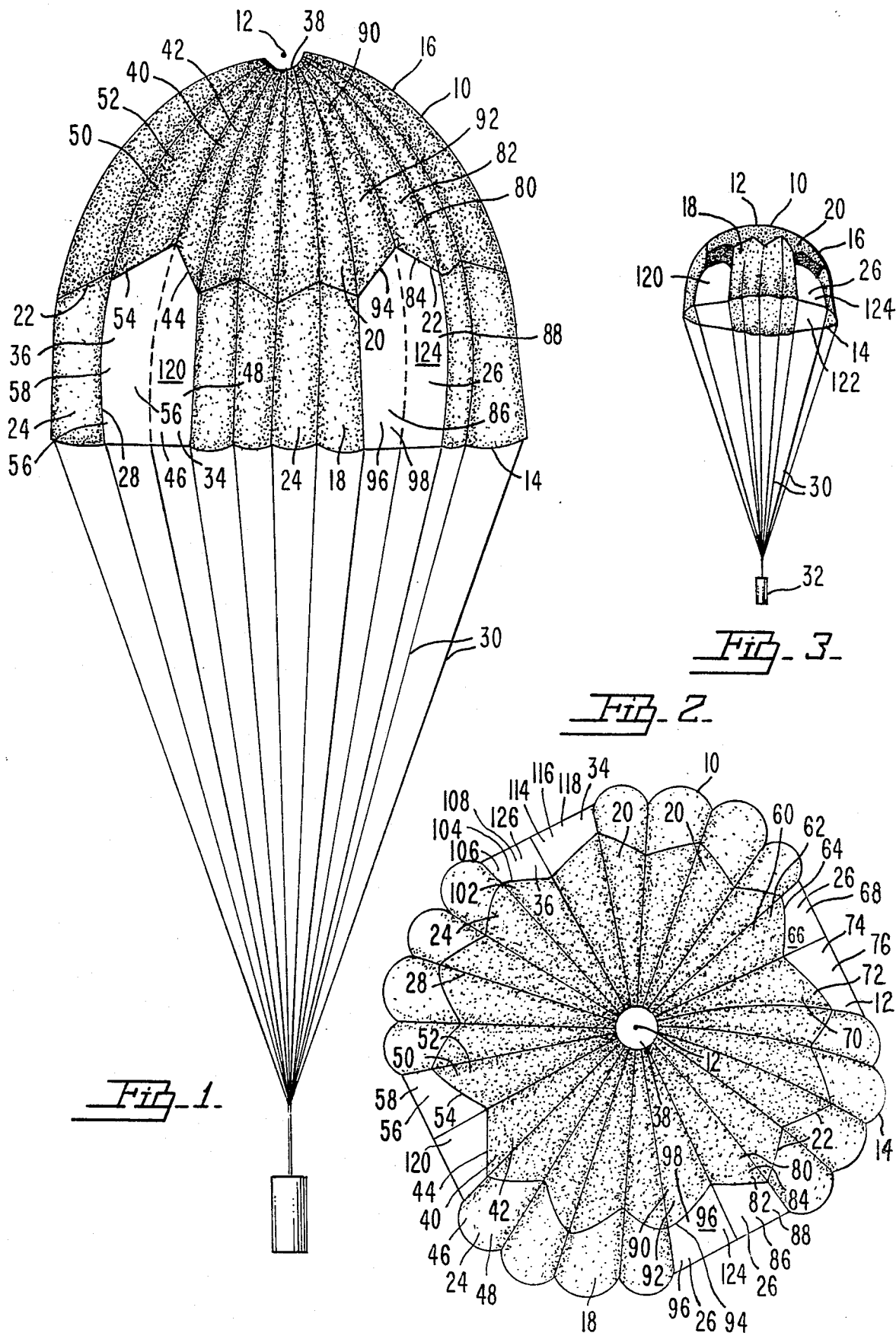

RADIALLY CONSTRUCTED CRUCIFORM PARACHUTE

BACKGROUND OF THE INVENTION

1. Field of the Invention

The present invention provides a parachute of the cruciform-type which is utilized primarily for the carrying of small loads for air delivery of payloads such as weapons and detection devices. The overall size of the canopy of such cruciform parachutes is normally between six inches and fifteen feet in diameter approximately.

Cruciform designs are notable for the low cost. Originally cruciform parachutes were commonly made by laying two fabric panels across one another at right angles and joining them with a cross such as when placed flat on the floor forming a cross symbol.

Furthermore, cruciform parachutes inherently have an inflated shape which enhances stability. This stability is achieved by the natural placement of four large gaps or gores in the canopy. These gores prevent oscillating as the parachute descends in order to enhance the reliability of weapons delivery.

2. Description of the Prior Art

Conventional cruciform parachutes are fine during delivery of air payloads by aircraft moving at relatively slow speeds. However with the increase in speed of such delivery aircraft, problems have developed. In particular, previously used parachutes tend to have problems inflating as well as problems remaining in a normally inflated orientation. These problems result often from the suspension lines which are attached to the center portion of each panel being stretched unevenly and greater than the outer line. This may result in line failure as well as payload loss.

Also, with the introduction of "Kevlar" as the material for the suspension lines, the lines have become much more inelastic which prevents stretching of conventional suspension lines which have heretofore somewhat compensated for the unequal tensions existant thereon.

Examples of patents showing prior art previously used as cruciform parachutes are noted such as U.S. Pat. No. 1,777,441 patented Oct. 7, 1930 to I. V. Malmer on a Parachute; U.S. Pat. No. 2,404,672 patented July 23, 1946 to C. A. Volf on a Vented Parachute; U.S. Pat. No. 2,683,575 patented July 13, 1954 to H. G. Heinrich on a Vented Sector Parachute; U.S. Pat. No. 2,733,028 patented Jan. 31, 1956 to H. K. Epple on a Parachute Canopy Construction; U.S. Pat. No. 2,925,971 patented Feb. 23, 1960 to J. A. Istel et al on a Non-Oscillating, Non-Steerable Parachute; U.S. Pat. No. 3,298,639 patented Jan. 17, 1967 to H. G. Heinrich et al on a Gliding Parachute; U.S. Pat. No. 3,420,478 patented Jan. 7, 1969 to O. B. Ferguson on a Parachute; U.S. Pat. No. 3,531,067 patented Sept. 29, 1970 to J. R. Mitchell on a Parachute and U.S. Pat. No. 3,602,462 patented Aug. 31, 1971 to R. J. Slater et al on a Parachute.

SUMMARY OF THE INVENTION

The present invention provides a radially constructed cruciform parachute which is adapted to support a load therebelow. The parachute itself includes a canopy means having a hemispherically-shaped member defining an apex in the uppermost portion. The canopy means also defines a lower canopy edge being generally circular around the lowermost portion thereof.

A plurality of panel members are each positioned extending vertically from a position adjacent the apex to the lower canopy edge. The panel members are attached with respect to one another along the vertically extending edges thereof to form the hemispherically-shaped member of the canopy means. Each panel includes an upper panel section extending from a position near the apex vertically downwardly therefrom toward the lower canopy edge. The upper panel section also includes an intermediate edge along the bottom or lowermost portion thereof. A lower panel section is defined extending from the intermediate edge of the upper panel section downwardly to the lower canopy edge of the canopy means.

A plurality of the individual panels will have lower panel sections which define open sections therein to form gores for facilitating stability of the overall cruciform parachute. These open sections will extend from the lower canopy edge upwardly to the immediate edge of the upper panel. The open sections will be defined laterally by the vertical edges of the adjacent panel sections as well as the intermediate edge thereabove. Each of the open sections will be diametrically oppositely positioned from one another about the hemispherically-shaped member of the canopy to provide increased stability while inflating and after inflation.

A plurality of support lines will be secured with respect to the lower canopy edge between each adjacent panel means and will extend downwardly therefrom. The support lines will extend further downwardly and be joined with respect to one another at a location therebelow approximately adjacent to the location of the load.

Preferably the hemispherically-shaped canopy will include an apex aperture at the uppermost central area thereof to facilitate parachute stability. Also to prevent stretching of the support lines, it is preferable that the support lines themselves be made of Kevlar material which has been shown to be relatively inelastic. The support lines may further extend upwardly beyond the lower canopy edge and be attached along the seams between adjacent panel sections. The support lines may extend further upwardly to be secured mutually with respect to one another at the uppermost point of the cruciform parachute defined as the apex.

In the preferred configuration, the canopy will include 24 panels with 16 completely solid panels and 8 panels having an open section in the lower panel section thereof. These eight panels will be grouped into four sets of two panels each. In this configuration each of the two associated open panels will be adjacent to one another to form an overall open gore. These four gores will then be positioned in sets of two each with each pair of gores with any given set being located diametrically opposite with respect to one another.

One gore may be configured by a first panel member having a first upper panel section which is solid and a first intermediate edge defining the lowermost portion of the first upper panel section. A first lower panel section will also be defined within the first panel member which defines a first open section therein extending from the first intermediate edge to the lower canopy edge.

A similarly configured second panel member may be positioned adjacent to the first panel member and includes a second upper panel section thereon. The second upper panel section will have a second intermediate edge along the lowermost section thereof. This open section will extend from the second intermediate edge down to the lower canopy edge. The second panel member will preferably be positioned adjacent to the first panel in such a manner that the first open section is positioned adjacent to the second open section. Thus the first open section and the second open section will cooperate with respect to one another to define a larger first open area defined as the first gore. To form the desired shape of the gore, preferably the first and second intermediate edges will be inclined obliquely with respect to the lower canopy edge in such a manner as to be inclined vertically with respect to one another to form an open point therebetween.

In the preferred embodiment of the present invention four such gores are formed in a similar manner. That is namely, the first and second panel members form the first gore means whereas the third and fourth panel members having open sections in the lower panel areas thereof form a second gore means. Furthermore, a fifth and sixth panel member define open areas in the lower portions thereof to define a third gore means and finally a seventh and eighth panel member define open sections in the lower area thereof to define a fourth gore means.

In the preferred configuration the first gore, second gore, third gore and fourth gore will be equally spaced with respect to one another circumferentially about the lower canopy edge of the hemispherically-shaped canopy in order to provide the overall stability normally achieved by such cruciform parachutes.

It is an object of the present invention to provide a radially constructed cruciform parachute wherein equally spaced gores provide increased stability not available heretofore in such parachutes.

It is an object of the present invention to provide a radially constructed cruciform parachute wherein Kevlar lines are utilized to prevent stretching of the support lines.

It is an object of the present invention to provide a radially constructed cruciform parachute wherein canopy sizes of from six inches to fifteen feet in diameter are capable of usage for the air delivery of payloads such as weapons and detection devices such as anti-tank mines and the like.

It is an object of the present invention to provide a radially constructed cruciform parachute wherein usage with air delivery vehicles having higher air speed is possible without decreasing the stability of the delivery parachute.

It is an object of the present invention to provide a radially constructed cruciform parachute wherein cost is maintained extremely low as has been possible with conventional cruciform parachutes.

It is an object of the present invention to provide a radially constructed cruciform parachute wherein targeting of delivery of payloads to specific positions on the ground is made more accurate.

It is an object of the present invention to provide a radially constructed cruciform parachute wherein stressing on the suspension lines is more evenly exerted.

It is an object of the present invention to provide a radially constructed cruciform parachute wherein the shape of the stabilizing gores available in conventional cruciform parachutes used heretofore is used with radially constructed such parachutes.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a front plan view of an embodiment of the radially constructed cruciform parachute of the present invention;

FIG. 2 is a bottom plan view of the embodiment shown in FIG. 1; and

FIG. 3 is a perspective illustration of an embodiment of the radially constructed cruciform parachute of the present invention.

DETAILED DESCRIPTION OF THE PREFERRED EMBODIMENT

The present invention provides a radially constructed cruciform parachute which is specifically adapted to carry a load for delivery such as weapons and detection devices wherein canopies sized from six inches to fifteen feet in diameter can be utilized. The canopy means 10 will preferably include an apex 12 at the uppermost portion thereof at which point the individual suspension lines 30 will be secured with respect to one another.

The canopy means 10 preferably includes a lower canopy edge 14 extending about the lowermost portion of the hemispherically-shaped member 16 thereof. The canopy 10 itself is preferably defined by a plurality of vertically extending panel members 18 each of which is secured at the lateral or vertical extending edge thereof with respect to the adjacent similarly shaped panel member 18. Panel members 18 preferably further include an upper panel section 20 therein as well as an intermediate edge 22 along the lowermost portion of the upper panel section 20. A lower panel section 24 will extend downwardly from the intermediate edge 22 to the lower canopy edge 14.

Certain of the panel members 18 will include open sections 26 which may preferably extend to the entire surface area of the lower panel sections 24. These open sections 26 may be positioned adjacent to other panel members 18 which have similar open sections 26 in such a manner as to define gores 120, 122, 124 and 126.

Open sections 26 will be specifically defined on the uppermost portion by the intermediate edge 22 and on the lateral portions by the vertical edges 28 of panels 18. The suspension or support lines 30 will extend downwardly from the lower canopy edge 14 and be joined together at a position below canopy 10 adjacent to the load 32.

Preferably the support lines 30 will be joined together at the apex 12. The canopy means 10 will preferably define an apex aperture 38 about the apex 12 to facilitate stability of the overall canopy device. The suspension lines will extend downwardly from the joined position at the apex 12 along the seams between adjacent panels 18. That is the support lines 30 will extend and preferably actually be attached to the vertical edges 28 of the individual panels. The support lines will then extend further downwardly to the lower canopy edge 14.

The overall stability of the cruciform parachute is achieved by the particularly shaped open sections which together in sets 34 in two open sections each will form the gores 120, 122, 124 and 126. Two adjacent open sections 36 such as first open section 48 and second open section 58 will form a single gore such as first gore 120.

First panel member 40 will define the first upper section 42 and the first lower panel section 46 with the first intermediate edge 44 extending therebetween. The first open section 48 will then be defined by the vertical edges 28 of the panels adjacent to the first panel member 40 and by the first intermediate edge 44 thereabove and the lower canopy edge 14 therebelow.

A similarly configured second panel member 50 will be positioned adjacent to the first panel member 40. Second panel member 50 defines a second upper section 52 and a second lower panel section 56 with a second intermediate edge 54 therebetween. Second open section 58 will then be defined on the upper limit by the second intermediate edge 54 and the lower limit by the lower canopy edge 14. Thus the first open section 48 and the second open section 58 will be adjacent to one another to define the first gore 120. In the preferred configuration, the first immediate edge 44 and the second immediate edge 54 will be obliquely oriented with respect to the lower canopy edge 14 in such a manner as to extend upwardly toward one another to form an open point therebetween. This is the particular shape of a gore which has been found to provide the greatest stability to a cruciform-type parachute.

In a similar configuration, the third panel member 60 will define a third upper section 62 and a third lower panel section 66 having a third intermediate edge 64 therebetween. Furthermore, a fourth panel member 70 will include a fourth upper section 72 having a lowermost portion defined as the fourth immediate edge 74. The fourth lower panel section 76 will define a fourth lower section 78. In a similar manner the third lower panel section 66 will define the third open section 68. Preferably the combination of a third open section 68 and the fourth open section 78 will define a second gore area 122. The location of the third and fourth panel members and the second gore 122 will preferably be diametrically opposite from the location of the first gore 120 to provide increased stability to the final overall cruciform parachute structure. Also similarly the third intermediate edge 64 and the fourth intermediate edge 74 will be obliquely inclined with respect to the lower canopy edge 14 upwardly with respect to one another to form a second gore 122 of identical shape with first gore 120.

The first gore 120 and the second gore 122 are preferably located at 180 degrees with respect to one another about the circular canopy edge 14 of the hemispherically-shaped member 16. Similarly the third gore 124 and the fourth gore 126 will preferably be located equally spaced between the first and second gores 120 and 122.

In particular the third gore 124 will preferably be defined by a fifth panel member 80 and a sixth panel member 90. Fifth panel member 80 will preferably include a fifth upper section 82 and a fifth lower panel section 86. Fifth upper section 82 includes a fifth intermediate edge 84 along the lowermost portion thereto define therebelow a fifth open section 88 which extends down to the lower canopy edge 14. Sixth panel member 90 preferably includes a sixth upper section and a sixth lower panel section 96 with a sixth intermediate edge 94 therebetween. Sixth lower panel section 96 defines the sixth open section 98 extending from the sixth intermediate edge downwardly to the lower canopy edge 14.

Thus, the fifth panel member 80 positioned adjacent to the sixth panel member 90 the fifth open section 88 and the sixth open section 98 will be adjacent to one another to cooperatively define a third gore 124 preferably having the same shape as first gore 120 and second gore 122.

Finally, a seventh panel member 100 will preferably be positioned adjacent to an eighth panel member 110 at a position diametrically opposite from the fifth panel member 80 and the sixth panel member 90. Seventh panel member 100 will define a seventh upper section 102 and a seventh lower panel section 106. Seventh upper section 102 will define a seventh intermediate edge 104 along the lowermost portion thereof. A seventh open section 108 will therefore be defined between the seventh intermediate edge 104 and the lower canopy edge 14. Eighth panel member 110 will include an eighth upper section 112 and an eighth lower panel section 116 defining an eighth intermediate edge 114 therebetween. Eighth lower panel section 116 will define an eighth open section 118 therein defined at the uppermost portion by the eighth intermediate edge 114 and at the lowermost portion by the lower canopy edge 14.

In this manner the seventh open section 108 and the eighth open section 118 will define the fourth gore 126 which is positioned diametrically opposite from the third gore 124 about the hemispherically-shaped member 16 of canopy 10. Fourth gore 126 will also be of the identical shape as the other three gores wherein the seventh intermediate edge 104 and the eighth intermediate edge 114 will be inclined obliquely with respect to the lower canopy edge 14 upwardly with respect to one another to form an open point to facilitate stability of the overall cruciform parachute configuration.

The final configuration of the parachute of the present invention has all the advantages of previously configured cruciform parachutes but has increased stability and the capability for usage for higher speed air drops by utilizing the radial construction. The combination of the radial construction with the previously utilized four oppositely configured gores achieves an overall stable construction which is itself usable at these higher speeds.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:
1. A radially constructed cruciform parachute adapted to support a load comprising:
  (a) a canopy means including:
    (1) a generally hemispherically-shaped member defining an apex and an apex aperture at the uppermost position thereon;
    (2) a lower canopy edge being generally circular therealong;
    (3) at least 24 panel means each extending vertically from adjacent said apex to said lower canopy edge, said panel means being of equal size and shape and being attached along the vertical edges thereof with respect to adjacent panel means, each of said panel means including an upper panel section extending from a position near said apex vertically downwardly therefrom toward said lower canopy edge, said upper panel section further including intermediate edge along the bottom thereof, said panel means further including a lower panel section extending from said intermediate edge of said upper panel section vertically downwardly to said lower canopy edge of said canopy means, a plurality of said lower panel sections defining open sections extending from said lower canopy edge to said intermediate edge of said upper panel, said open sections being defined by the vertical edges of said adjacent panel sections and said intermediate edge thereabove, each of said open sections being diametrically oppositely positioned from another of said open sections to provide increased stability of the radially constructed cruciform parachute while inflating and after inflation, said panel means further including:

a. a first panel member including a first upper panel section, a first intermediate edge and a first lower panel section therein, said first lower Panel section defining a first open section therein extending from said first intermediate edge to said lower canopy edge;

b. a second panel member positioned adjacent to said first panel member and including a second upper panel section, a second intermediate edge and a second lower panel section therein, said first intermediate edge and said second intermediate edge being angularly oriented with respect to said lower canopy edge and obliquely inclined toward one another, said second lower panel section defining a second open section therein extending from said second intermediate edge to said lower canopy edge, said first open section and said second open section being adjacent and together defining a first gore;

c. a third panel member including a third upper panel section, a third intermediate edge and a third lower panel therein, said third lower panel section defining a third open section therein extending from said third intermediate edge to said lower canopy edge;

d. a fourth panel member positioned adjacent to said third panel member and including a fourth upper panel section, a fourth intermediate edge and a fourth lower panel section therein, said third intermediate edge and said fourth intermediate edge being angularly oriented with respect to said lower canopy edge and obliquely inclined toward and another, said fourth lower panel section defining a fourth open section therein extending from said fourth intermediate edge to said lower canopy edge, said third open section and said fourth open section being adjacent and together defining a second gore, said second gore being positioned diametrically opposite from said first gore along said hemispherically-shaped member of said canopy means;

e. a fifth panel member including a fifth upper panel section, a fifth intermediate edge and a fifth lower panel section therein, said fifth lower panel section defining a fifth open section therein extending from said fifth intermediate edge to said lower canopy edge;

f. a sixth panel member positioned adjacent to said fifth panel member and including a sixth upper panel section, a sixth intermediate edge and a sixth lower panel section therein, said fifth intermediate edge and said sixth intermediate edge being angularly oriented with respect to said lower canopy edge and obliquely inclined toward one another, said sixth lower panel section defining a sixth open section therein extending from said sixth intermediate edge to said lower canopy edge, said fifth open section and said sixth open section being adjacent and together defining a third gore;

g. a seventh panel member including a seventh upper panel section, a seventh intermediate edge and a seventh lower panel section therein, said seventh lower panel section defining a seventh open section therein extending from said seventh intermediate edge to said lower canopy edge;

h. an eighth member positioned adjacent to said seventh panel member and including an eighth upper panel section, an eighth intermediate edge and an eighth lower panel section therein, said seventh intermediate edge and said eighth intermediate edge being angularly oriented with respect to said lower canopy edge and obliquely inclined toward one another, said eighth lower panel section defining an eighth open section therein extending from said eighth intermediate edge to said lower canopy edge, said seventh open section and said eighth open section being adjacent and together defining a fourth gore, said fourth being positioned diametrically opposite from said third gore along said hemispherically-shaped member of said canopy means; and (b) a plurality of support lines of Kevlar material each secured with respect to one another at said apex and extending downwardly and attached along the vertically extending intersection between adjacent panel members, said support lines extending further downwardly beyond said lower canopy edge and being joined with respect to one another adjacent the location of the load therebelow.

2. The radially constructed cruciform parachute as defined in claim 1 wherein said first gore, said second gore, said third gore and said fourth gore are equally spaced with respect to one another circumferentially about said lower canopy edge of said hemispherically-shaped member.

* * * * *